(12) United States Patent
Cho

(10) Patent No.: US 11,946,803 B1
(45) Date of Patent: Apr. 2, 2024

(54) RAMAN SPECTROSCOPY EQUIPMENT

(71) Applicant: ANSWERAY INC., Gwacheon-si (KR)

(72) Inventor: Seong Ho Cho, Gwacheon-si (KR)

(73) Assignee: ANSWERAY INC., Gwacheon-si (KR)

( * ) Notice: Subject to any disclaimer, the term of this patent is extended or adjusted under 35 U.S.C. 154(b) by 0 days.

(21) Appl. No.: 18/523,263

(22) Filed: Nov. 29, 2023

(30) Foreign Application Priority Data

Dec. 29, 2022 (KR) .................. 10-2022-0189108
Feb. 21, 2023 (KR) .................. 10-2023-0022612

(51) Int. Cl.
*G01J 3/44* (2006.01)
*G01J 3/02* (2006.01)
*G01N 21/65* (2006.01)

(52) U.S. Cl.
CPC ........... *G01J 3/0208* (2013.01); *G01J 3/0218* (2013.01); *G01J 3/0237* (2013.01); *G01J 3/4412* (2013.01); *G01N 21/65* (2013.01)

(58) Field of Classification Search
CPC ...... G01J 3/0208; G01J 3/0218; G01J 3/0237; G01J 3/44; G01J 3/4412; G01N 21/65; A61B 5/0075
See application file for complete search history.

(56) References Cited

U.S. PATENT DOCUMENTS

| | | | | |
|---|---|---|---|---|
| 9,909,992 | B2* | 3/2018 | Van Dorpe | G02B 6/0031 |
| 2003/0007147 | A1* | 1/2003 | Johnson | G02B 6/4298 |
| | | | | 356/326 |
| 2003/0016614 | A1* | 1/2003 | Vo-Dinh | G11C 11/42 |
| | | | | 369/120 |
| 2016/0202164 | A1* | 7/2016 | Trainer | G01N 15/0211 |
| | | | | 356/336 |

FOREIGN PATENT DOCUMENTS

| | | |
|---|---|---|
| CN | 104931479 A | 9/2015 |
| CN | 109060766 A | 12/2018 |

OTHER PUBLICATIONS

Korean Office Action for related KR Application No. 10-2023-0022612 dated Mar. 29, 2023 from Korean Intellectual Property Office.
Korean Notice of Allowance for related KR Application No. 10-2023-0022612 dated May 10, 2023 from Korean Intellectual Property Office.

* cited by examiner

*Primary Examiner* — Abdullahi Nur

(74) *Attorney, Agent, or Firm* — Paratus Law Group, PLLC

(57) ABSTRACT

Disclosed is Raman spectroscopy equipment including a light source unit configured to generate excitation light, a first optical fiber configured to transmit the excitation light received from the light source unit, a light radiation unit configured to receive the excitation light from the first optical fiber, a target material located near the light radiation unit, the target material being configured to receive the excitation light from the light radiation unit and to generate first scattered light, a light focusing unit configured to concentrate the first scattered light in the vicinity of the target material and the light radiation unit and to change the first scattered light to second scattered light, a second optical fiber configured to transmit the second scattered light received from the light focusing unit, and a spectroscopy unit configured to convert the second scattered light received from the second optical fiber into an electrical signal.

29 Claims, 5 Drawing Sheets

RAMAN SPECTROSCOPY EQUIPMENT

CROSS-REFERENCE TO RELATED APPLICATION

This application claims the benefit of priority to Korean Patent Application No. 10-2022-0189108 filed on Dec. 29, 2022 and Korean Patent Application No. 10-2023-0022612 filed on Feb. 21, 2023, the disclosure of which is incorporated herein by reference in its entirety.

BACKGROUND OF THE INVENTION

1. Field of the Invention

The present invention relates to Raman spectroscopy equipment for radiating excitation light to one side of a target material along an optical path passing through the target material and concentrating scattered light from the other side of the target material.

2. Description of the Related Art

In general, a Raman spectrometer uses Raman spectroscopy capable of performing non-destructive analysis since Raman spectroscopy does not particularly require a process of pre-treating a sample to be analyzed. Raman spectroscopy is based on the principle of radiating excitation light (e.g. a laser) to a material to be analyzed and generating scattered light from the material to be analyzed to measure the relative energy (or wavelength or frequency) change of inelastically scattered light relative to the excitation light, whereby analysis results of the material to be analyzed are not affected by the wavelength of the excitation light.

In addition, Raman spectroscopy has numerous advantages in that analysis time for the material to be analyzed is short, analysis of the material to be analyzed is possible in a liquid state, a solid state, or a gaseous state, and there is no risk of damaging the material to be analyzed (hereinafter referred to as a target material) since Raman spectroscopy is a non-destructive method. Conventionally, in order to implement Raman spectroscopy, the excitation light is radiated to one surface of the target material through a light radiation unit and the scattered light is concentrated on one surface of the target material through a light capture unit in the Raman spectrometer.

The light radiation unit receives excitation light from a light generation unit using an optical lens and an optical mirror, and the light capture unit concentrates scattered light from the target material using an optical lens and an optical mirror. Here, the light capture unit must have a large numerical aperture NA of the optical lens in order to increase the concentration rate of the scattered light. The numerical aperture NA of the optical lens may be described as diameter of the lens/(2×focal length of the lens). Since the diameter of the lens is often constrained by the shape of the optical lens, the focal length of the lens is often used to adjust the numerical aperture NA of the optical lens.

However, the focal length of the lens is determined between the target material and the optical lens based on one surface of the target material and is thus set regardless of the size of the target material, whereby there is limitation in reducing the focal length of the lens. In contrast, the light capture unit may be provided with a plurality of optical fibers disposed in the vicinity of the optical lens and the optical mirror in order to increase the concentration rate of scattered light, whereby it is possible to concentrate scattered light in proportion to the number of optical fibers. Here, the plurality of optical fibers faces one optical lens, whereby individual optical fibers receive individual scattered light from the optical lens, and individual scattered light is collected in proportion to the number of optical fibers to form scattered light.

Since the plurality of optical fibers faces the optical lens but is not individually located precisely at the focal length of the optical lens, however, it is not possible to obtain desired intensity of scattered light. In addition, the light capture unit must maintain a fixed orientation with respect to the target material, whereby it is not possible to explore the surface and interior of the target material in depth through the scattered light or to accurately check the shape of the target material.

SUMMARY OF THE INVENTION

The present invention has been made in view of the above problems, and it is an object of the present invention to provide Raman spectroscopy equipment configured such that excitation light is radiated to one side of a target material along an optical path passing through the target material and scattered light is concentrated from the other side of the target material, whereby it is possible to obtain desired intensity of the scattered light in proportion to the number of optical fibers even though at least one optical fiber is located in the vicinity of the target material, such that position-specific scattered light is selectively concentrated from the target material, whereby it is possible to explore the surface and interior of the target material in depth, and such that some of the scattered light is selectively used, whereby it is possible to accurately check the shape of the target material.

In accordance with the present invention, the above and other objects can be accomplished by the provision of Raman spectroscopy equipment including a light source unit configured to generate excitation light, a first optical fiber configured to receive the excitation light from the light source unit and to transmit the excitation light, a light radiation unit configured to receive the excitation light from the first optical fiber, a target material located in the vicinity of the light radiation unit, the target material being configured to receive the excitation light from the light radiation unit and to generate first scattered light, a light focusing unit configured to concentrate the first scattered light in the vicinity of the target material and the light radiation unit and to change the first scattered light to second scattered light, a second optical fiber configured to receive the second scattered light from the light focusing unit and to transmit the second scattered light, and a spectroscopy unit configured to receive the second scattered light from the second optical fiber and to convert the second scattered light into an electrical signal, wherein the target material is transparent or semi-transparent to the excitation light and the first scattered light, the target material is exposed to the excitation light and the first scattered light along an optical path passing through the target material, and the light radiation unit or the light focusing unit has a focus in the target material or on an outer circumferential surface of the target material.

The light radiation unit may include a first collimator lens, a band pass filter, and a light radiation lens, and each of the first collimator lens and the light radiation lens may have a convex lens shape.

The first collimator lens and the light radiation lens may be configured to receive the excitation light from the first optical fiber through the first collimator lens, to form the excitation light in parallel between the first collimator lens and the light radiation lens, and to radiate the excitation light to the target material through the light radiation lens.

The band pass filter may narrow the wavelength band of the excitation light, and the light radiation lens may have a focus in the target material.

The light radiation lens, the band pass filter, and the first collimator lens may be located gradually away from the target material in the order of the light radiation lens, the band pass filter, and the first collimator lens, and the light radiation lens may be located at one side of the target material in contact or non-contact with the target material.

The light focusing unit may include a light focusing lens, a long pass filter, and a second collimator lens, and each of the light focusing lens and the second collimator lens may have a convex lens shape.

The light focusing lens, the long pass filter, and the second collimator lens may be configured to concentrate the first scattered light from the target material through the light focusing lens, to form the first scattered light in parallel between the light focusing lens and the long pass filter, to change the first scattered light to the second scattered light through the long pass filter, to form the second scattered light in parallel between the long pass filter and the second collimator lens, and to transmit the second scattered light to the second optical fiber through the second collimator lens.

The light focusing lens may have a focus in the target material, and the long pass filter may shield elastically scattered light of the first scattered light and may allow inelastically scattered light to pass therethrough such that the inelastically scattered light corresponds to the second scattered light.

The light focusing lens, the long pass filter, and the second collimator lens may be located gradually away from the target material in the order of the light focusing lens, the long pass filter, and the second collimator lens, and the light focusing lens may be located at the other side of the target material in contact or non-contact with the target material.

When the light radiation unit and the light focusing unit respectively have a light radiation lens and a light focusing lens near the target material, the light radiation lens and the light focusing lens may have the same focus or different focuses in the target material.

The light focusing unit may be located on the target material in plural, each light focusing unit may include a light focusing lens, a long pass filter, and a second collimator lens, and each of the light focusing lens and the second collimator lens may have a convex lens shape.

When the second optical fiber is constituted by a single line in the vicinity of the spectroscopy unit and diverges into a plurality of lines in the vicinity of the target material to receive individual first scattered light from the individual light focusing units, the light focusing lens, the long pass filter, and the second collimator lens may be configured to concentrate the individual first scattered light from the target material through the light focusing lens, to form the individual first scattered light in parallel between the light focusing lens and the long pass filter, to change the individual first scattered light to individual second scattered light through the long pass filter, to form the individual second scattered light in parallel between the long pass filter and the second collimator lens, and to transmit the individual second scattered light to the second optical fiber through the second collimator lens.

The light focusing lens may have a focus in the target material, the long pass filter may shield elastically scattered light of the individual first scattered light and may allow inelastically scattered light to pass therethrough such that the inelastically scattered light corresponds to the individual second scattered light, and the individual first or second scattered light may be collected in the same number as the individual light focusing units to form first and second scattered light.

The light focusing lens, the long pass filter, and the second collimator lens may be located gradually away from the target material in the order of the light focusing lens, the long pass filter, and the second collimator lens, and the light focusing lens may be located at the other side of the target material in contact or non-contact with the target material.

When the light radiation unit and each light focusing unit respectively have a light radiation lens and a light focusing lens near the target material, the light radiation lens and the light focusing lens may have the same focus or different focuses in the target material.

The light focusing unit may include a plurality of first light focusing units located near the target material and a single second light focusing unit located near the spectroscopy unit, each first light focusing unit may include a first light focusing lens and a second collimator lens, the second light focusing unit may include a second light focusing lens, a long pass filter, and a third collimator lens, and each of the first and second light focusing lenses and the second and third collimator lenses may have a convex lens shape.

The second optical fiber may include a second front optical fiber constituted by a single line in the vicinity of the second light focusing unit and diverging into a plurality of lines in the vicinity of the target material between the target material and the second light focusing unit and a second rear optical fiber constituted by a single line between the second light focusing unit and the spectroscopy unit.

The second front optical fiber may collect individual first scattered light from the individual first light focusing units in the same number as the individual first light focusing units to form first scattered light and may transmit the first scattered light to the second light focusing unit, the second light focusing unit may receive the first scattered light from the second front optical fiber and may form second scattered light through the long pass filter, the second rear optical fiber may transmit the second scattered light from the second light focusing unit toward the spectroscopy unit, each first scattered light may include elastically scattered light and inelastically scattered light, and the second scattered light may include inelastically scattered light.

The first light focusing lens may be located at the other side of the target material in contact or non-contact with the target material, the first light focusing lens may have a focus in the target material, and the first light focusing lens and the second collimating lens may be configured to concentrate individual first scattered light from the target material through the first light focusing lens, to form the individual first scattered light in parallel between the first light focusing lens and the second collimating lens, and to transmit the individual first scattered light to the second front optical fiber through the second collimating lens.

The second light focusing lens, the long pass filter, and the third collimator lens may be configured to concentrate the first scattered light from the second front optical fiber through the second light focusing lens, to form the first scattered light in parallel between the second light focusing lens and the long pass filter, to change the first scattered light to second scattered light through the long pass filter, to form the second scattered light in parallel between the long pass filter and the third collimator lens, and to transmit the second scattered light to the second rear optical fiber through the third collimator lens, and the long pass filter may shield elastically scattered light of the first scattered light and may allow inelastically scattered light to pass therethrough such that the inelastically scattered light corresponds to the second scattered light.

When the light radiation unit and each first light focusing unit respectively have a light radiation lens and a first light focusing lens near the target material, the light radiation lens and the first light focusing lens may have the same focus or different focuses in the target material.

The light radiation unit may include a light radiation lens, a band pass filter, and a first collimator lens gradually away from the target material, the light radiation lens may be located at one side of the target material, may be spaced apart from the target material, and may have a focus in the target material or on the outer circumferential surface of the target material, and each of the first collimator lens and the light radiation lens may have a convex lens shape.

The light focusing unit may include a plurality of first light focusing units located near the target material and a single second light focusing unit located near the spectroscopy unit, each first light focusing unit may include a first light focusing lens and a second collimator lens, the second light focusing unit may include a second light focusing lens, a long pass filter, and a third collimator lens, and each of the first and second light focusing lenses and the second and third collimator lenses may have a convex lens shape.

The second optical fiber may include a second front optical fiber constituted by a single line in the vicinity of the second light focusing unit and diverging into a plurality of lines in the vicinity of the target material between the target material and the second light focusing unit and a second rear optical fiber constituted by a single line between the second light focusing unit and the spectroscopy unit.

The second front optical fiber may collect individual first scattered light from the individual first light focusing units in the same number as the individual first light focusing units to form the first scattered light and may transmit the first scattered light to the second light focusing unit, the second light focusing unit may receive the first scattered light from the second front optical fiber and may form second scattered light through the long pass filter, the second rear optical fiber may transmit the second scattered light from the second light focusing unit toward the spectroscopy unit, each first scattered light may include elastically scattered light and inelastically scattered light, and the second scattered light may include inelastically scattered light.

The first light focusing lens may be located at the other side of the target material, may be spaced apart from the target material, and may have a focus in the target material or on the outer circumferential surface of the target material, and the first light focusing lens and the second collimator lens may be configured to concentrate individual first scattered light from the target material through the first light focusing lens, to form the individual first scattered light in parallel between the first light focusing lens and the second collimator lens, and to transmit the individual first scattered light to the second front optical fiber through the second collimator lens.

The second light focusing lens, the long pass filter, and the third collimator lens may be configured to concentrate the first scattered light from the second front optical fiber through the second light focusing lens, to form the first scattered light in parallel between the second light focusing lens and the long pass filter, to change the first scattered light to second scattered light through the long pass filter, to form the second scattered light in parallel between the long pass filter and the third collimator lens, and to transmit the second scattered light to the second rear optical fiber through the third collimator lens, and the long pass filter may shield elastically scattered light of the first scattered light and may allow inelastically scattered light to pass therethrough such that the inelastically scattered light corresponds to the second scattered light.

When the light radiation unit and each first light focusing unit respectively have a light radiation lens and a first light focusing lens near the target material, the light radiation lens and the first light focusing lens may have different focuses in the target material or on the outer circumferential surface of the target material.

The light radiation unit and the individual first light focusing units may move relative to the target material, or the target material may move relative to the light radiation unit and the individual first light focusing units.

The Raman spectroscopy equipment may further include an optical imaging module disposed in the vicinity of the light radiation unit and the individual first light focusing units, wherein the optical imaging module may include an optical instrument configured to receive the first scattered light from the target material in order to check the position of the light radiation unit or each first light focusing unit, a third optical fiber configured to receive the first scattered light from the optical instrument and to transmit the first scattered light, and a camera configured to receive the first scattered light from the third optical fiber and to display an image showing the positional relationship of the light radiation unit or each first light focusing unit with respect to the target material.

The optical instrument may include a plurality of lenses configured to move relative to the light radiation unit and each first light focusing unit and to concentrate the first scattered light from the target material.

The Raman spectroscopy equipment may further include an optical imaging module connected to the second front optical fiber, wherein the optical imaging module may include a third optical fiber configured to receive individual first scattered light from individual lines extending from the second front optical fiber to the vicinity of the target material and to transmit the individual first scattered light, an optical instrument configured to receive the individual first scattered light from the third optical fiber in order to check the position-specific shape of the target material, and a camera configured to receive the individual first scattered light from the optical instrument and to display an image showing a position-specific shape of the target material, and the optical instrument may include a plurality of lenses configured to concentrate the individual first scattered light from the target material.

DETAILED DESCRIPTION OF THE PREFERRED EMBODIMENTS

Hereinafter, preferred embodiments of the present invention will be described in detail with reference to the accompanying drawings such that the present invention can be easily implemented by a person having ordinary skill in the art to which the present invention pertains. In the embodiments, a mirror may be used to implement the present invention of FIGS. 1-6.

It is possible to change a lens to a mirror. Consequently, it is possible to change a convex lens to a concave mirror as needed, and it is possible to change a concave lens to a convex mirror as needed.

Figure 1:
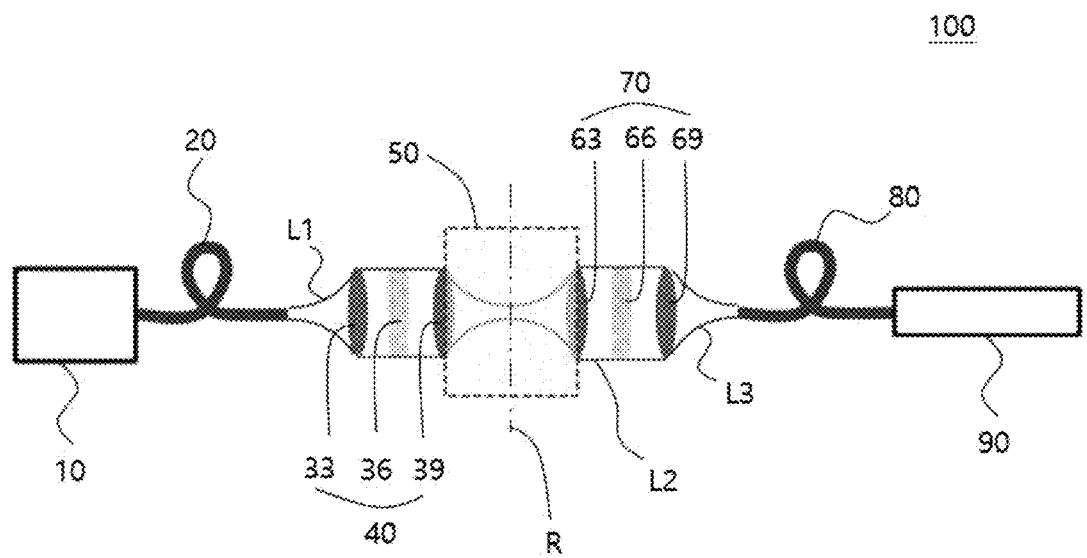
FIG. 1 is a schematic view showing Raman spectroscopy equipment according to a first embodiment of the present invention.

FIG. 1 is a schematic view showing Raman spectroscopy equipment according to a first embodiment of the present invention.

Referring to FIG. 1, the Raman spectroscopy equipment 100 according to the present invention schematically includes a light source unit 10, a first optical fiber 20, a light radiation unit 40, a target material 50, a light focusing unit 70, a second optical fiber 80, and a spectroscopy unit 90. The light source unit 10 emits excitation light L1. The first optical fiber 20 receives the excitation light L1 from the light source unit 10 and transmits the excitation light L1. The light radiation unit 40 receives the excitation light L1 from the first optical fiber 20.

The target material 50 is located in the vicinity of the light radiation unit 40 to receive the excitation light L1 from the light radiation unit 40 and to generate first scattered light L2. In the figure, the target material 50 has a rectangular shape when viewed in two dimensions, but may have, for example, another angular shape, a circular shape, or an elliptical shape. The target material 50 may have a certain shape when viewed in three dimensions. The excitation light L1 is located at the left of a reference line R passing through the target material 50 in FIG. 1. The first scattered light L2 is located at the right of the reference line R passing through the target material 50 in FIG. 1. The light focusing unit 70 concentrates the first scattered light L2 in the vicinity of the target material 50 and the light radiation unit 40 to change the first scattered light L2 to second scattered light L3.

The second optical fiber 80 receives the second scattered light L3 from the light focusing unit 70 and transmits the second scattered light L3. The spectroscopy unit 90 receives the second scattered light L3 from the second optical fiber 80 and converts the second scattered light L3 into an electrical signal. Here, the target material 50 is transparent or semi-transparent to the excitation light L1 and the first scattered light L2. The light radiation unit 40 or the light focusing unit 70 has a focus in the target material 50 or on an outer circumferential surface of the target material 50.

More specifically, the light radiation unit 40 includes a first collimator lens 33, a band pass filter 36, and a light radiation lens 39. Each of the first collimator lens 33 and the light radiation lens 39 has a convex lens shape.

The first collimator lens 33 and the light radiation lens 39 receive the excitation light L1 from the first optical fiber 20 through the first collimator lens 33, form the excitation light L1 in parallel between the first collimator lens 33 and the light radiation lens 39, and radiate the excitation light L1 to the target material 50 through the light radiation lens 39. The band pass filter 36 narrows the wavelength band of the excitation light L1. The light radiation lens 39 has a focus in the target material 50.

The light radiation lens 39, the band pass filter 36, and the first collimator lens 33 are located gradually away from the target material 50 in the order of the light radiation lens 39, the band pass filter 36, and the first collimator lens 33. The light radiation lens 39 may be located at one side of the target material 50 and may be in contact or non-contact with the target material 50. The light focusing unit 70 includes a light focusing lens 63, a long pass filter 66, and a second collimator lens 69. Each of the light focusing lens 63 and the second collimator lens 69 has a convex lens shape.

The light focusing lens 63, the long pass filter 66, and the second collimator lens 69 concentrate the first scattered light L2 from the target material 50 through the light focusing lens 63, form the first scattered light L2 in parallel between the light focusing lens 63 and the long pass filter 66, change the first scattered light L2 to the second scattered light L3 through the long pass filter 66, form the second scattered light L3 in parallel between the long pass filter 66 and the second collimator lens 69, and transmit the second scattered light L3 to the second optical fiber 80 through the second collimator lens 69.

The light focusing lens 63 has a focus in the target material 50. The long pass filter 66 shields elastically scattered light of the first scattered light L2 and allows inelastically scattered light to pass therethrough such that the inelastically scattered light corresponds to the second scattered light L3. The light focusing lens 63, the long pass filter 66, and the second collimator lens 69 are located gradually away from the target material 50 in the order of the light focusing lens 63, the long pass filter 66, and the second collimator lens 69. The light focusing lens 63 may be located at the other side of the target material 50 and may be in contact or non-contact with the target material 50.

When the light radiation lens 39 of the light radiation unit 40 and the light focusing lens 63 of the light focusing unit 70 are located near the target material 50, the light radiation lens 39 and the light focusing lens 63 may have the same focus or different focuses in the target material 50. That is, the light radiation lens 39 and the light focusing lens 63 radiate the excitation light L1 and concentrate the first scattered light L2 on the optical path passing through the target material 50.

Figure 2:
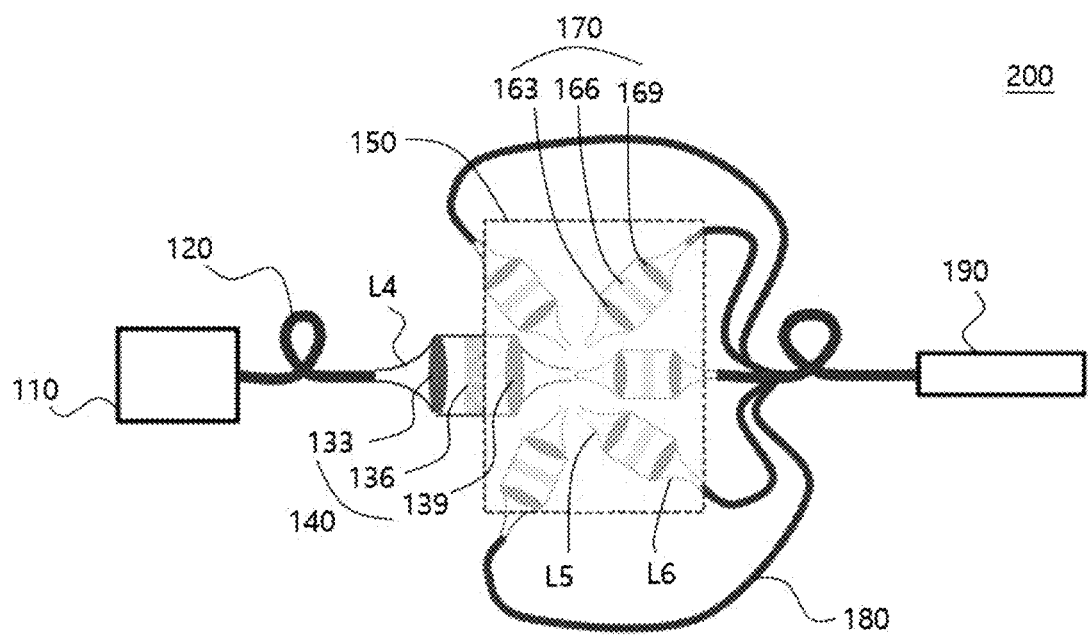
FIG. 2 is a schematic view showing Raman spectroscopy equipment according to a second embodiment of the present invention.

FIG. 2 is a schematic view showing Raman spectroscopy equipment according to a second embodiment of the present invention.

Referring to FIG. 2, the Raman spectroscopy equipment 200 has a similar structure to the Raman spectroscopy equipment 100 of FIG. 1. Schematically, the Raman spectroscopy equipment 200 includes a light source unit 110, a first optical fiber 120, a light radiation unit 140, a target material 150, a light focusing unit 170, a second optical fiber 180, and a spectroscopy unit 190. The light source unit 110, the first optical fiber 120, the light radiation unit 140, the target material 150, and the spectroscopy unit 190 have the same structures and the same optical properties as the light source unit 10, the first optical fiber 20, the light radiation unit 40, the target material 50, and the spectroscopy unit 90 of FIG. 1.

Here, the light source unit 110, the first optical fiber 120, and the light radiation unit 140 transmit excitation light L4 toward the target material 150. The light radiation unit 140 includes a first collimator lens 133, a band pass filter 136, and a first light radiation lens 139. Meanwhile, the light focusing unit 170 and the second optical fiber 180 have different structures from the light focusing unit 70 and the second optical fiber 80 of FIG. 1. More specifically, a plurality of light focusing units 170 is located on the target material 150. Each light focusing unit 170 includes a light focusing lens 163, a long pass filter 166, and a second collimator lens 169.

Each of the light focusing lens 163 and the second collimator lens 169 has a convex lens shape. When the second optical fiber 180 is constituted by a single line in the vicinity of the spectroscopy unit 190 and diverges into a plurality of lines in the vicinity of the target material 150 to receive individual first scattered light L5 from individual light focusing units 170, the light focusing lens 163, the long pass filter 166, and the second collimator lens 169 concentrate the individual first scattered light L5 from the target material 150 through the light focusing lens 163, and form the individual first scattered light in parallel between the light focusing lens 183 and the long pass filter 166.

In addition, the light focusing lens 163, the long pass filter 166, and the second collimator lens 169 change the individual first scattered light L5 to individual second scattered light L6 through the long pass filter 166, form the individual second scattered light L6 in parallel between the long pass filter 166 and the second collimator lens 169, and transmit the individual second scattered light L6 to the second optical fiber 180 through the second collimator lens 169. The light focusing lens 162 has a focus in the target material 150.

The long pass filter 166 shields elastically scattered light of the individual first scattered light L5 and allows inelastically scattered light to pass therethrough such that the inelastically scattered light corresponds to the individual second scattered light L6. The individual first or second scattered light L5 or L6 is collected in the same number as the individual light focusing units 170 to form first and second scattered light. The light focusing lens 163, the long pass filter 188, and the second collimator lens 169 are located gradually away from the target material 150 in the order of the light focusing lens 163, the long pass filter 166, and the second collimator lens 169.

The light focusing lens 163 may be located at the other side of the target material 150 and may be in contact or non-contact with the target material 150. When the light radiation lens 139 of the light radiation unit 140 and the light focusing lens 163 of each light focusing unit 170 are located near the target material 150, the light radiation lens 139 and the light focusing lens 163 may have the same focus or different focuses in the target material 150.

Figure 3:
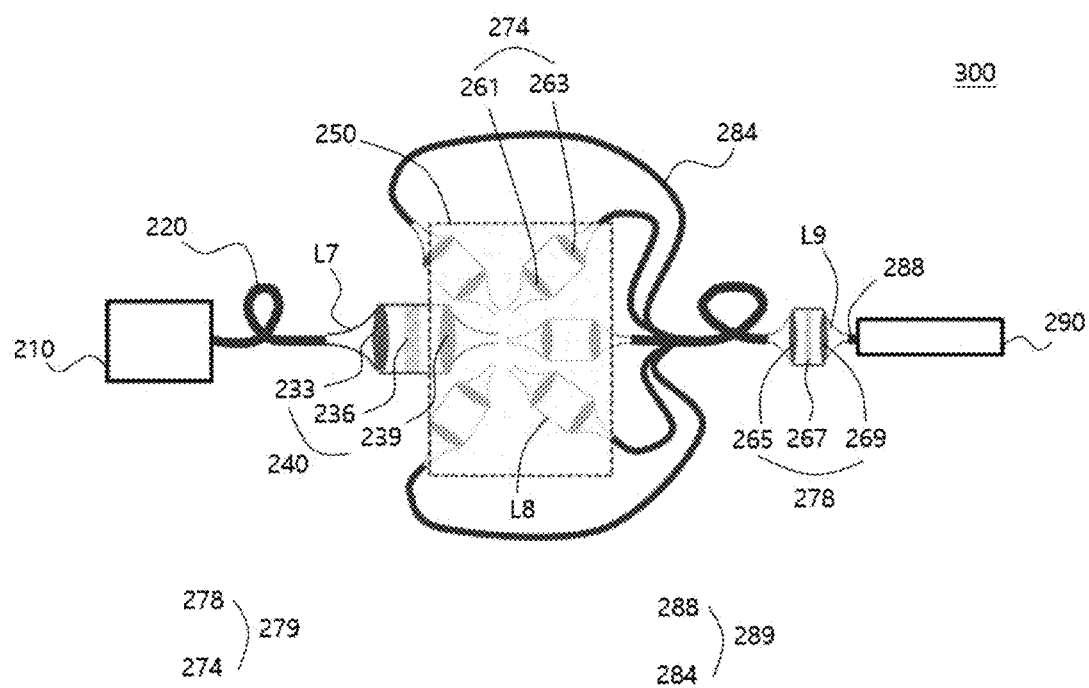
FIG. 3 is a schematic view showing Raman spectroscopy equipment according to a third embodiment of the present invention.

FIG. 3 is a schematic view showing Raman spectroscopy equipment according to a third embodiment of the present invention.

Referring to FIG. 3, the Raman spectroscopy equipment 300 has a similar structure to the Raman spectroscopy equipment 100 of FIG. 1. Schematically, the Raman spectroscopy equipment 300 includes a light source unit 210, a first optical fiber 220, a light radiation unit 240, a target material 250, a light focusing unit 279, a second optical fiber 289, and a spectroscopy unit 290. The light source unit 210, the first optical fiber 220, the light radiation unit 240, the target material 250, and the spectroscopy unit 290 have the same structures and the same optical properties as the light source unit 10, the first optical fiber 20, the light radiation unit 40, the target material 50, and the spectroscopy unit 90 of FIG. 1.

Here, the light source unit 210, the first optical fiber 220, and the light radiation unit 240 transmit excitation light L7 toward the target material 250. The light radiation unit 240 includes a first collimator lens 233, a band pass filter 26, and a first light radiation lens 239. Meanwhile, the light focusing unit 279 and the second optical fiber 289 have different structures from the light focusing unit 70 and the second optical fiber 80 of FIG. 1. More specifically, the light focusing unit 279 includes a plurality of first light focusing units 274 located near the target material 250 and a single second light focusing unit 278 located near the spectroscopy unit 290.

Each first light focusing unit 274 includes a first light focusing lens 261 and a second collimator lens 263. The second light focusing unit 278 includes a second light focusing lens 265, a long pass filter 267, and a third collimator lens 269. Each of the first and second light focusing lenses 261 and 265 and the second and third collimator lenses 263 and 269 has a convex lens shape. The second optical fiber 289 includes a second front optical fiber 284 constituted by a single line in the vicinity of the second light focusing unit 278 and diverging into a plurality of lines in the vicinity of the target material 250 between the target material 250 and the second light focusing unit 278 and a second rear optical fiber 288 constituted by a single line between the second light focusing unit 278 and the spectroscopy unit 290.

The second front optical fiber 284 collects individual first scattered light L8 from the individual first light focusing units 274 in the same number as the individual first light focusing units 274 to form first scattered light and transmits the first scattered light to the second light focusing unit 278. The second light focusing unit 278 receives the first scattered light from the second front optical fiber 284 and forms second scattered light L9 through the long pass filter 267. The second rear optical fiber 288 transmits the second scattered light L9 from the second light focusing unit 278 toward the spectroscopy unit 290. Each first scattered light L8 includes elastically scattered light and inelastically scattered light. The second scattered light L9 includes inelastically scattered light.

The first light focusing lens 261 is located at the other side of the target material 250, is in contact or non-contact with the target material 250, and has a focus in the target material 250. The first light focusing lens 261 and the second collimating lens 263 concentrate the individual first scattered light L8 from the target material 250 through the first light focusing lens 261, form the individual first scattered light L8 in parallel between the first light focusing lens 261 and the second collimating lens 263, and transmit the individual first scattered light L8 to the second front optical fiber 284 through the second collimating lens 263.

The second light focusing lens 265, the long pass filter 267, and the third collimator lens 269 concentrate the first scattered light from the second front optical fiber 284 through the second light focusing lens 265, form the first scattered light in parallel between the second light focusing lens 265 and the long pass filter 267, change the first scattered light to second scattered light L9 through the long pass filter 267, form the second scattered light L9 in parallel between the long pass filter 267 and the third collimator lens 269, and transmit the second scattered light L9 to the second rear optical fiber 288 through the third collimator lens 269.

The long pass filter 267 shields elastically scattered light of the first scattered light and allows inelastically scattered light to pass therethrough such that the inelastically scattered light corresponds to the second scattered light L9. When the light radiation lens 239 of the light radiation unit 240 and the first light focusing lens 261 of each first light focusing unit 274 are located near the target material 250, the light radiation lens 239 and the first light focusing lens 261 may have the same focus or different focuses in the target material 250.

Figure 4:
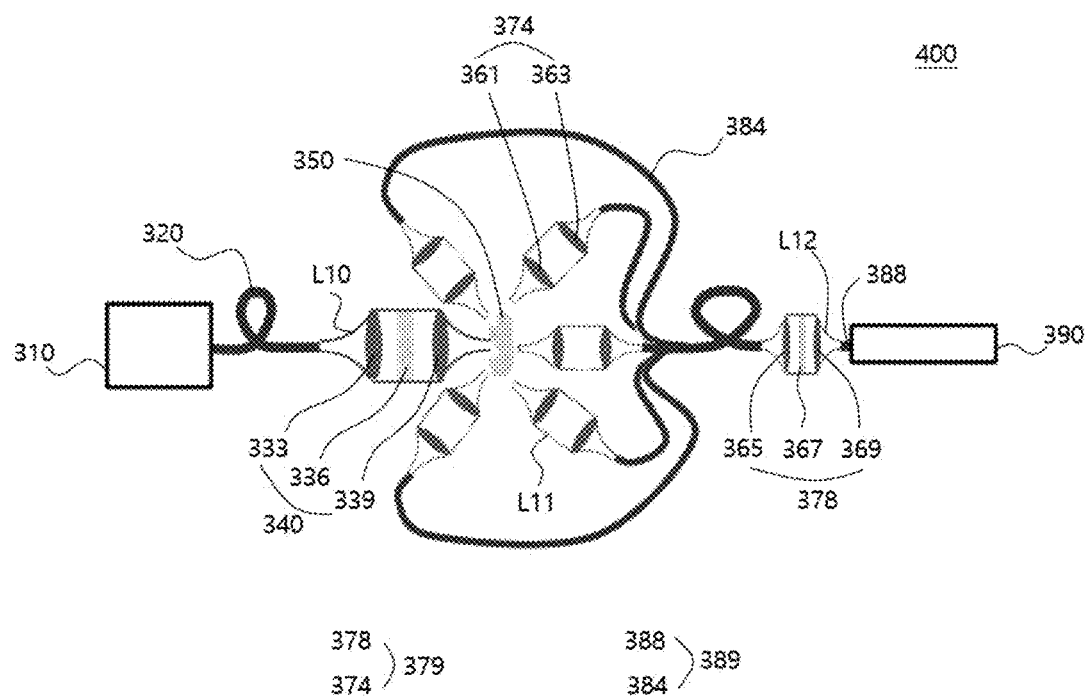
FIG. 4 is a schematic view showing Raman spectroscopy equipment according to a fourth embodiment of the present invention.

FIG. 4 is a schematic view showing Raman spectroscopy equipment according to a fourth embodiment of the present invention.

Referring to FIG. 4, the Raman spectroscopy equipment 400 has a similar structure to the Raman spectroscopy equipment 100 of FIG. 1. Schematically, the Raman spectroscopy equipment 400 includes a light source unit 310, a first optical fiber 320, a light radiation unit 340, a target material 350, a light focusing unit 379, a second optical fiber 389, and a spectroscopy unit 390. The light source unit 310, the first optical fiber 320, the light radiation unit 340, and the spectroscopy unit 390 have the same structures as the light source unit 10, the first optical fiber 20, the light radiation unit 40, and the spectroscopy unit 90 of FIG. 1.

Here, the light source unit 310, the first optical fiber 320, and the light radiation unit 340 transmit excitation light L10 toward the target material 350. Meanwhile, the target material 350, the light focusing unit 379, and the second optical fiber 389 have different structures from the target material 50, the light focusing unit 70, and the second optical fiber 80 of FIG. 1. In the figure, the target material 350 is shapeless, when viewed in two dimensions, but the target material 350 may have a certain shape. The target material 350 has the same optical properties as the target material 50 of FIG. 1.

More specifically, the light radiation unit 340 includes a light radiation lens 339, a band pass filter 336, and a first collimator lens 333 gradually away from the target material 350. The light radiation lens 339 is located at one side of the target material 350, is spaced apart from the target material 350, and has a focus in the target material 350 or on an outer circumferential surface of the target material 350. Each of the first collimator lens 333 and the light radiation lens 339 has a convex lens shape.

The light focusing unit 379 includes a plurality of first light focusing units 374 located near the target material 350 and a single second light focusing unit 378 located near the spectroscopy unit 390. Each first light focusing unit 374 includes a first light focusing lens 361 and a second collimator lens 363. The second light focusing unit 378 includes a second light focusing lens 365, a long pass filter 367, and a third collimator lens 369. Each of the first and second light focusing lenses 361 and 365 and the second and third collimator lenses 363 and 369 has a convex lens shape.

The second optical fiber 389 includes a second front optical fiber 384 constituted by a single line in the vicinity of the second light focusing unit 378 and diverging into a plurality of lines in the vicinity of the target material 350 between the target material 350 and the second light focusing unit 378 and a second rear optical fiber 388 constituted by a single line between the second light focusing unit 378 and the spectroscopy unit 390. The second front optical fiber 384 collects individual first scattered light L11 from the individual first light focusing units 374 in the same number as the individual first light focusing units 374 to form first scattered light and transmits the first scattered light to the second light focusing unit 378.

The second light focusing unit 378 receives the first scattered light from the second front optical fiber 384 and forms second scattered light L12 through the long pass filter 367. The second rear optical fiber 388 transmits the second scattered light L12 from the second light focusing unit 378 toward the spectroscopy unit 390. Each first scattered light L11 includes elastically scattered light and inelastically scattered light. The second scattered light L12 includes inelastically scattered light. The first light focusing lens 361 is located at the other side of the target material 350, is spaced apart from the target material 350, and has a focus in the target material 350 or on the outer circumferential surface of the target material 350.

The first light focusing lens 361 and the second collimator lens 363 concentrate the individual first scattered light L11 from the target material 350 through the first light focusing lens 361, form the individual first scattered light L11 in parallel between the first light focusing lens 361 and the second collimator lens 363, and transmit the individual first scattered light to the second front optical fiber 384 through the second collimator lens 363.

The second light focusing lens 365, the long pass filter 367, and the third collimator lens 369 concentrate the first scattered light from the second front optical fiber 384 through the second light focusing lens 365, form the first scattered light in parallel between the second light focusing lens 365 and the long pass filter 367, change the first scattered light to second scattered light L12 through the long pass filter 367, form the second scattered light L12 in parallel between the long pass filter 367 and the third collimator lens 369, and transmit the second scattered light L12 to the second rear optical fiber 388 through the third collimator lens 369.

The long pass filter 367 shields elastically scattered light of the first scattered light and allows inelastically scattered light to pass through such that the inelastically scattered light corresponds to the second scattered light L12. When the light radiation lens 339 of the light radiation unit 340 and the first light focusing lens 361 of each first light focusing unit 374 are located near the target material 350, the light radiation lens 339 and the first light focusing lens 361 may have different focuses in the target material 350 or on the outer circumferential surface of the target material 350. The light radiation unit 340 and the individual first light focusing units 374 may move relative to the target material 350, or the target material 350 may move relative to the light radiation unit 340 and the individual first light focusing units 374.

As a result, the individual first light focusing units 374 may concentrate individual first scattered light generated at specific positions in the target material or on the outer circumferential surface of the target material.

Figure 5:
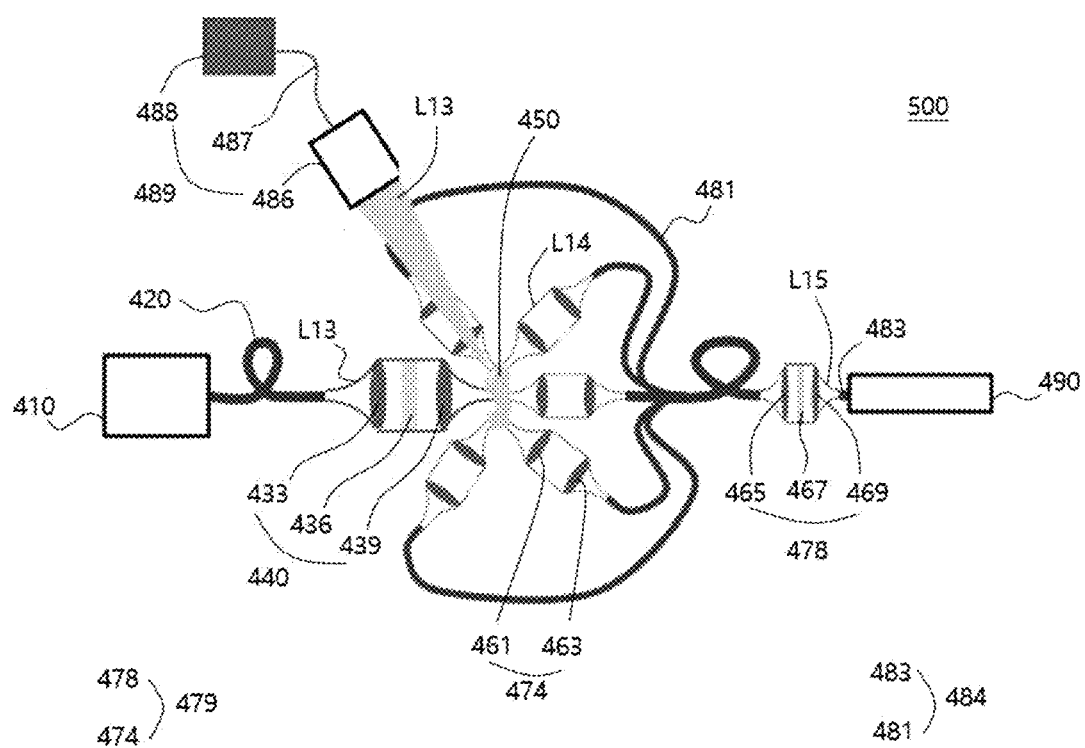
FIG. 5 is a schematic view showing Raman spectroscopy equipment according to a fifth embodiment of the present invention.

FIG. 5 is a schematic view showing Raman spectroscopy equipment according to a fifth embodiment of the present invention.

Referring to FIG. 5, the Raman spectroscopy equipment 500 has a similar structure to the Raman spectroscopy equipment 400 of FIG. 4. Schematically, the Raman spectroscopy equipment 500 includes a light source unit 410, a first optical fiber 420, a light radiation unit 440, a target material 450, a light focusing unit 479, a second optical fiber 484, and a spectroscopy unit 490. The light source unit 410, the first optical fiber 420, the light radiation unit 440, the target material 450, the light focusing unit 479, the second optical fiber 484, and the spectroscopy unit 490 have the same structures and the same optical properties as the light source unit 310, the first optical fiber 320, the light radiation unit 340, the target material 350, the light focusing unit 379, the second optical fiber 389, and the spectroscopy unit 390 of FIG. 4.

Here, the light source unit 410, the first optical fiber 420, and the light radiation unit 440 transmit excitation light L13 toward the target material 450. The light radiation unit 440 includes a first collimator lens 433, a band pass filter 436, and a light radiation lens 439. The light focusing unit 479 includes a plurality of first light focusing units 474 and a single second light focusing unit 478. Each first light focusing unit 474 includes a first light focusing lens 461 and a second collimator lens 463. The second light focusing unit 478 includes a second light focusing lens 465, a long pass filter 467, and a third collimator lens 469. The second optical fiber 484 includes a second front optical fiber 481 and a rear optical fiber 483.

At this time, the individual first light focusing units 474 concentrate individual first scattered light L14 from the target material 450. The second front optical fiber 481 receives the individual first scattered light L14 from the individual first light focusing units 474 and forms first scattered light. The second light focusing unit 478 receives the first scattered light from the second front optical fiber 481 and changes the first scattered light to second scattered light L15 through the long pass filter 467. The rear optical fiber 483 receives the second scattered light L15 from the second light focusing unit 478 and transmits the second scattered light L15 to the spectroscopy unit 490.

Meanwhile, the Raman spectroscopy equipment 500 further includes an optical imaging module 489 disposed in the vicinity of the light radiation unit 440 and the individual first light focusing units 474. The optical imaging module 489 includes an optical instrument 486 configured to receive the first scattered light from the target material 450 in order to check the position of the light radiation unit 440 or the individual first light focusing units 474, a third optical fiber 487 configured to receive the first scattered light from the optical instrument 486 and to transmit the first scattered light, and a camera configured to receive the first scattered light from the third optical fiber 487 and to display an image showing the positional relationship of the light radiation unit 440 or the individual first light focusing units 474 with respect to the target material 450.

The optical instrument 486 includes a plurality of lenses configured to move relative to the light radiation unit 440 and the individual first light focusing units 474 and to concentrate the first scattered light from the target material 450. As a result, it is possible to accurately check the shape of the target material 450 and the positions of the individual first light focusing units 474 relative to the target material 450 through the optical imaging module 489.

Figure 6:
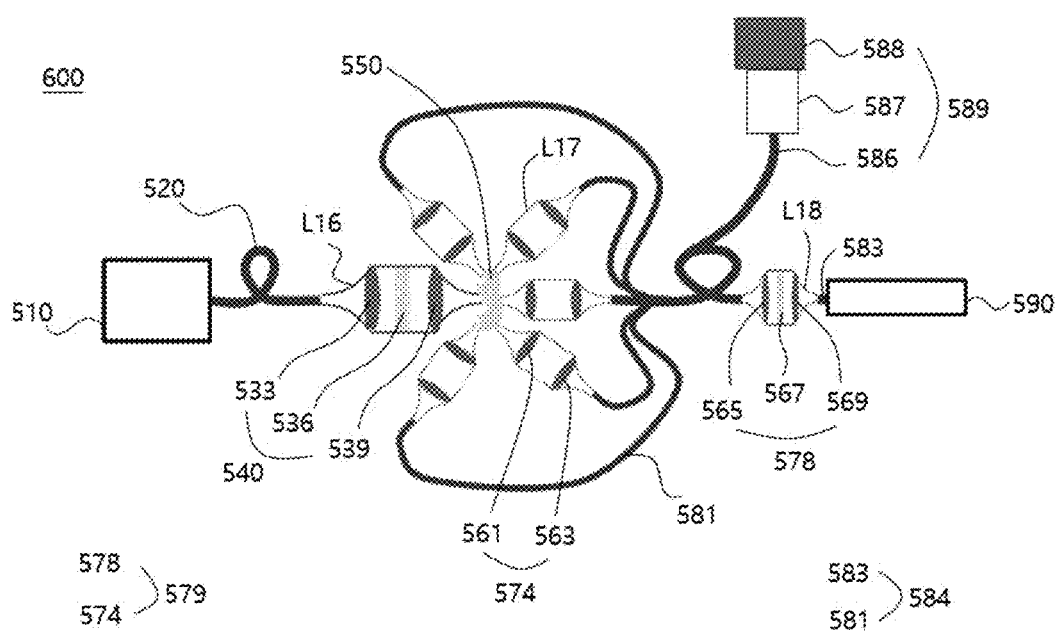
FIG. 6 is a schematic view showing Raman spectroscopy equipment according to a sixth embodiment of the present invention.

FIG. 6 is a schematic view showing Raman spectroscopy equipment according to a sixth embodiment of the present invention.

Referring to FIG. 6, the Raman spectroscopy equipment 600 has a similar structure to the Raman spectroscopy equipment 400 of FIG. 4. Schematically, the Raman spectroscopy equipment 600 includes a light source unit 510, a first optical fiber 520, a light radiation unit 540, a target material 550, a light focusing unit 579, a second optical fiber 584, and a spectroscopy unit 590. The light source unit 510, the first optical fiber 520, the light radiation unit 540, the target material 550, the light focusing unit 579, the second optical fiber 584, and the spectroscopy unit 590 have the same structures and the same optical properties as the light source unit 310, the first optical fiber 320, the light radiation unit 340, the target material 350, the light focusing unit 379, the second optical fiber 389, and the spectroscopy unit 390 of FIG. 4.

Here, the light source unit 510, the first optical fiber 520, and the light radiation unit 540 transmit excitation light L16 toward the target material 550. The light radiation unit 540 includes a first collimator lens 533, a band pass filter 536, and a light radiation lens 539. The light focusing unit 579 includes a plurality of first light focusing units 574 and a single second light focusing unit 578. Each first light focusing unit 574 includes a first light focusing lens 561 and a second collimator lens 563. The second light focusing unit 578 includes a second light focusing lens 565, a long pass filter 567, and a third collimator lens 569. The second optical fiber 584 includes a second front optical fiber 581 and a rear optical fiber 583.

At this time, the individual first light focusing units 574 concentrate individual first scattered light L17 from the target material 550. The second front optical fiber 581 receives the individual first scattered light L17 from the individual first light focusing units 574 and forms first scattered light. The second light focusing unit 578 receives the first scattered light from the second front optical fiber 581 and changes the first scattered light to second scattered light L18 through the long pass filter 567. The rear optical fiber 583 receives the second scattered light L18 from the second light focusing unit 578 and transmits the second scattered light L18 to the spectroscopy unit 590.

Meanwhile, the Raman spectroscopy equipment 600 further includes an optical imaging module 589 connected to the second front optical fiber 581. The optical imaging module 589 includes a third optical fiber 586 configured to receive the individual first scattered light L17 from individual lines extending from the second front optical fiber 581 to the vicinity of the target material 550 and to transmit the individual first scattered light L17, an optical instrument 587 configured to receive the individual first scattered light L17 from the third optical fiber 586 in order to check the position-specific shape of the target material 550, and a camera 588 configured to receive the individual first scattered light L17 from the optical instrument 587 and to display an image showing the position-specific shape of the target material 550.

The optical instrument 587 includes a plurality of lenses configured to concentrate the individual first scattered light L17 from the target material 550. As a result, it is possible to accurately check the shape of the target material 550 and the positions of the individual first light focusing units 574 relative to the target material 550 through the optical imaging module 589.

Raman spectroscopy equipment according to the present invention is configured such that:
- a light source unit, a light radiation unit, a target material, a light focusing unit, and a spectroscopy unit are sequentially disposed, a first optical fiber is located between the light source unit and the light radiation unit, and a second optical fiber is located between the light focusing unit and the spectroscopy unit;
- when excitation light sequentially passes through the light source unit, the first optical fiber, the light radiation unit, and the target material and scattered light sequentially passes through the target material, the light focusing unit, the second optical fiber, and the spectroscopy unit, the arrangement of the light focusing unit and the second optical fiber in the vicinity of the target material is diversified; and
- the excitation light is radiated to one side of the target material along an optical path passing through the target material, and the scattered light is concentrated from the other side of the target material, whereby it is possible to obtain desired intensity of the scattered light in proportion to the number of optical fibers even though at least one optical fiber is located in the vicinity of the target material.

Raman spectroscopy equipment according to the present invention is configured such that:

a light source unit, a light radiation unit, a target material, a light focusing unit, and a spectroscopy unit are sequentially disposed, a first optical fiber is located between the light source unit and the light radiation unit, and a second optical fiber is located between the light focusing unit and the spectroscopy unit;

the light radiation unit and the light focusing unit are moved relative to the target material or the target material is moved relative to the light radiation unit and the light focusing unit to concentrate scattered light while the surrounding environment of the target material is varied; and excitation light is radiated to one side of the target material along an optical path passing through the target material, and the scattered light is concentrated from the other side of the target material, whereby it is possible to concentrate position-specific scattered light from the target material, and therefore it is possible to explore the surface and interior of the target material in depth.

Raman spectroscopy equipment according to the present invention is configured such that:

a light source unit, a light radiation unit, a target material, a light focusing unit, and a spectroscopy unit are sequentially disposed, a first optical fiber is located between the light source unit and the light radiation unit, and a second optical fiber is located between the light focusing unit and the spectroscopy unit;

an optical imaging module located in the vicinity of the target material and the light focusing unit or connected to the second optical fiber is provided, and a part of scattered light is received through the optical module to capture an image of the target material or the light focusing unit; and excitation light is radiated to one side of the target material along an optical path passing through the target material, and the scattered light is concentrated from the other side of the target material, whereby it is possible to accurately check the shape of the target material and the position of the light focusing unit relative to the target material using the scattered light.

What is claimed is:

1. Raman spectroscopy equipment comprising:
a light source unit configured to generate excitation light;
a first optical fiber configured to receive the excitation light from the light source unit and to transmit the excitation light;
a light radiation unit configured to receive the excitation light from the first optical fiber;
a target material located in the vicinity of the light radiation unit, the target material being configured to receive the excitation light from the light radiation unit and to generate first scattered light;
a light focusing unit configured to concentrate the first scattered light in the vicinity of the target material and the light radiation unit and to change the first scattered light to second scattered light;
a second optical fiber configured to receive the second scattered light from the light focusing unit and to transmit the second scattered light; and
a spectroscopy unit configured to receive the second scattered light from the second optical fiber and to convert the second scattered light into an electrical signal, wherein the target material is transparent or semi-transparent to the excitation light and the first scattered light,
the target material is exposed to the excitation light and the first scattered light along an optical path passing through the target material,
the light radiation unit or the light focusing unit has a focus in the target material or on an outer circumferential surface of the target material,
the light radiation unit comprises a first collimator lens, a band pass filter, and a light radiation lens,
each of the first collimator lens and the light radiation lens has a convex lens shape,
the first collimator lens and the light radiation lens are configured to receive the excitation light from the first optical fiber through the first collimator lens, to form the excitation light in parallel between the first collimator lens and the light radiation lens, and to radiate the excitation light to the target material through the light radiation lens,
the band pass filter narrows a wavelength band of the excitation light, and
the light radiation lens has a focus in the target material.

2. The Raman spectroscopy equipment according to claim 1, wherein
the light radiation lens, the band pass filter, and the first collimator lens are located gradually away from the target material in the order of the light radiation lens, the band pass filter, and the first collimator lens, and
the light radiation lens is located at one side of the target material in contact or non-contact with the target material.

3. The Raman spectroscopy equipment according to claim 1, wherein
the light focusing unit comprises a light focusing lens, a long pass filter, and a second collimator lens, and
each of the light focusing lens and the second collimator lens has a convex lens shape.

4. The Raman spectroscopy equipment according to claim 3, wherein the light focusing lens, the long pass filter, and the second collimator lens are configured:
to concentrate the first scattered light from the target material through the light focusing lens;
to form the first scattered light in parallel between the light focusing lens and the long pass filter;
to change the first scattered light to the second scattered light through the long pass filter;
to form the second scattered light in parallel between the long pass filter and the second collimator lens; and
to transmit the second scattered light to the second optical fiber through the second collimator lens.

5. The Raman spectroscopy equipment according to claim 4, wherein
the light focusing lens has a focus in the target material, and
the long pass filter shields elastically scattered light of the first scattered light and allows inelastically scattered light to pass therethrough such that the inelastically scattered light corresponds to the second scattered light.

6. The Raman spectroscopy equipment according to claim 3, wherein
the light focusing lens, the long pass filter, and the second collimator lens are located gradually away from the target material in the order of the light focusing lens, the long pass filter, and the second collimator lens, and the light focusing lens is located at the other side of the target material in contact or non-contact with the target material.

7. The Raman spectroscopy equipment according to claim 1, wherein
when the light radiation unit and the light focusing unit respectively have a light radiation lens and a light focusing lens near the target material,
the light radiation lens and the light focusing lens have the same focus or different focuses in the target material.

8. The Raman spectroscopy equipment according to claim 1, wherein
the light focusing unit is located on the target material in plural,
each light focusing unit comprises a light focusing lens, a long pass filter, and a second collimator lens, and
each of the light focusing lens and the second collimator lens has a convex lens shape.

9. The Raman spectroscopy equipment according to claim 8, wherein
when the second optical fiber is constituted by a single line in the vicinity of the spectroscopy unit and diverges into a plurality of lines in the vicinity of the target material to receive individual first scattered light from the individual light focusing units,
the light focusing lens, the long pass filter, and the second collimator lens are configured:
to concentrate the individual first scattered light from the target material through the light focusing lens;
to form the individual first scattered light in parallel between the light focusing lens and the long pass filter;
to change the individual first scattered light to individual second scattered light through the long pass filter;
to form the individual second scattered light in parallel between the long pass filter and the second collimator lens; and
to transmit the individual second scattered light to the second optical fiber through the second collimator lens.

10. The Raman spectroscopy equipment according to claim 9, wherein
the light focusing lens has a focus in the target material,
the long pass filter shields elastically scattered light of the individual first scattered light and allows inelastically scattered light to pass therethrough such that the inelastically scattered light corresponds to the individual second scattered light, and
the individual first or second scattered light is collected in the same number as the individual light focusing units to form first and second scattered light.

11. The Raman spectroscopy equipment according to claim 8, wherein
the light focusing lens, the long pass filter, and the second collimator lens are located gradually away from the target material in the order of the light focusing lens, the long pass filter, and the second collimator lens, and
the light focusing lens is located at the other side of the target material in contact or non-contact with the target material.

12. The Raman spectroscopy equipment according to claim 8, wherein
when the light radiation unit and each light focusing unit respectively have a light radiation lens and a light focusing lens near the target material,
the light radiation lens and the light focusing lens have the same focus or different focuses in the target material.

13. The Raman spectroscopy equipment according to claim 1, wherein
the light focusing unit comprises a plurality of first light focusing units located near the target material and a single second light focusing unit located near the spectroscopy unit,
each first light focusing unit comprises a first light focusing lens and a second collimator lens,
the second light focusing unit comprises a second light focusing lens, a long pass filter, and a third collimator lens, and
each of the first and second light focusing lenses and the second and third collimator lenses has a convex lens shape.

14. The Raman spectroscopy equipment according to claim 13, wherein the second optical fiber comprises:
a second front optical fiber constituted by a single line in the vicinity of the second light focusing unit and diverging into a plurality of lines in the vicinity of the target material between the target material and the second light focusing unit; and
a second rear optical fiber constituted by a single line between the second light focusing unit and the spectroscopy unit.

15. The Raman spectroscopy equipment according to claim 14, wherein
the second front optical fiber collects individual first scattered light from the individual first light focusing units in the same number as the individual first light focusing units to form first scattered light and transmits the first scattered light to the second light focusing unit,
the second light focusing unit receives the first scattered light from the second front optical fiber and forms second scattered light through the long pass filter,
the second rear optical fiber transmits the second scattered light from the second light focusing unit toward the spectroscopy unit,
each first scattered light comprises elastically scattered light and inelastically scattered light, and
the second scattered light comprises inelastically scattered light.

16. The Raman spectroscopy equipment according to claim 14, wherein
the first light focusing lens is located at the other side of the target material in contact or non-contact with the target material,
the first light focusing lens has a focus in the target material, and
the first light focusing lens and the second collimating lens are configured:
to concentrate individual first scattered light from the target material through the first light focusing lens;
to form the individual first scattered light in parallel between the first light focusing lens and the second collimating lens; and
to transmit the individual first scattered light to the second front optical fiber through the second collimating lens.

17. The Raman spectroscopy equipment according to claim 14, wherein
the second light focusing lens, the long pass filter, and the third collimator lens are configured:
to concentrate the first scattered light from the second front optical fiber through the second light focusing lens;
to form the first scattered light in parallel between the second light focusing lens and the long pass filter;
to change the first scattered light to second scattered light through the long pass filter;

to form the second scattered light in parallel between the long pass filter and the third collimator lens; and to transmit the second scattered light to the second rear optical fiber through the third collimator lens, and the long pass filter shields elastically scattered light of the first scattered light and allows inelastically scattered light to pass therethrough such that the inelastically scattered light corresponds to the second scattered light.

18. The Raman spectroscopy equipment according to claim 13, wherein
when the light radiation unit and each first light focusing unit respectively have a light radiation lens and a first light focusing lens near the target material,
the light radiation lens and the first light focusing lens have the same focus or different focuses in the target material.

19. The Raman spectroscopy equipment according to claim 1, wherein
the light radiation unit comprises a light radiation lens, a band pass filter, and a first collimator lens gradually away from the target material,
the light radiation lens is located at one side of the target material, is spaced apart from the target material, and has a focus in the target material or on the outer circumferential surface of the target material, and
each of the first collimator lens and the light radiation lens has a convex lens shape.

20. The Raman spectroscopy equipment according to claim 1, wherein
the light focusing unit comprises a plurality of first light focusing units located near the target material and a single second light focusing unit located near the spectroscopy unit,
each first light focusing unit comprises a first light focusing lens and a second collimator lens,
the second light focusing unit comprises a second light focusing lens, a long pass filter, and a third collimator lens, and
each of the first and second light focusing lenses and the second and third collimator lenses has a convex lens shape.

21. The Raman spectroscopy equipment according to claim 20, wherein the second optical fiber comprises:
a second front optical fiber constituted by a single line in the vicinity of the second light focusing unit and diverging into a plurality of lines in the vicinity of the target material between the target material and the second light focusing unit; and
a second rear optical fiber constituted by a single line between the second light focusing unit and the spectroscopy unit.

22. The Raman spectroscopy equipment according to claim 21, wherein
the second front optical fiber collects individual first scattered light from the individual first light focusing units in the same number as the individual first light focusing units to form the first scattered light and transmits the first scattered light to the second light focusing unit,
the second light focusing unit receives the first scattered light from the second front optical fiber and forms second scattered light through the long pass filter,
the second rear optical fiber transmits the second scattered light from the second light focusing unit toward the spectroscopy unit, each first scattered light comprises elastically scattered light and inelastically scattered light, and the second scattered light comprises inelastically scattered light.

23. The Raman spectroscopy equipment according to claim 21, wherein
the first light focusing lens is located at the other side of the target material, is spaced apart from the target material, and has a focus in the target material or on the outer circumferential surface of the target material, and
the first light focusing lens and the second collimator lens are configured:
to concentrate individual first scattered light from the target material through the first light focusing lens;
to form the individual first scattered light in parallel between the first light focusing lens and the second collimator lens; and
to transmit the individual first scattered light to the second front optical fiber through the second collimator lens.

24. The Raman spectroscopy equipment according to claim 21, wherein
the second light focusing lens, the long pass filter, and the third collimator lens are configured:
to concentrate the first scattered light from the second front optical fiber through the second light focusing lens;
to form the first scattered light in parallel between the second light focusing lens and the long pass filter;
to change the first scattered light to second scattered light through the long pass filter;
to form the second scattered light in parallel between the long pass filter and the third collimator lens; and
to transmit the second scattered light to the second rear optical fiber through the third collimator lens, and
the long pass filter shields elastically scattered light of the first scattered light and allows inelastically scattered light to pass therethrough such that the inelastically scattered light corresponds to the second scattered light.

25. The Raman spectroscopy equipment according to claim 20, wherein
when the light radiation unit and each first light focusing unit respectively have a light radiation lens and a first light focusing lens near the target material,
the light radiation lens and the first light focusing lens have different focuses in the target material or on the outer circumferential surface of the target material.

26. The Raman spectroscopy equipment according to claim 20, wherein
the light radiation unit and the individual first light focusing units move relative to the target material, or
the target material moves relative to the light radiation unit and the individual first light focusing units.

27. The Raman spectroscopy equipment according to claim 20, further comprising:
an optical imaging module disposed in the vicinity of the light radiation unit and the individual first light focusing units, wherein
the optical imaging module comprises:
an optical instrument configured to receive the first scattered light from the target material in order to check a position of the light radiation unit or each first light focusing unit;
a third optical fiber configured to receive the first scattered light from the optical instrument and to transmit the first scattered light; and a camera configured to receive the first scattered light from the third optical fiber and to display an image showing a positional relationship of the light radiation unit or each first light focusing unit with respect to the target material.

28. The Raman spectroscopy equipment according to claim 27, wherein the optical instrument comprises a plurality of lenses configured to move relative to the light radiation unit and each first light focusing unit and to concentrate the first scattered light from the target material.

29. The Raman spectroscopy equipment according to claim 21, further comprising:
an optical imaging module connected to the second front optical fiber, wherein
the optical imaging module comprises:
a third optical fiber configured to receive individual first scattered light from individual lines extending from the second front optical fiber to the vicinity of the target material and to transmit the individual first scattered light;
an optical instrument configured to receive the individual first scattered light from the third optical fiber in order to check a position-specific shape of the target material; and
a camera configured to receive the individual first scattered light from the optical instrument and to display an image showing a position-specific shape of the target material, and
the optical instrument comprises a plurality of lenses configured to concentrate the individual first scattered light from the target material.

* * * * *